United States Patent [19]
Eisenberg

[11] Patent Number: 5,493,665
[45] Date of Patent: Feb. 20, 1996

[54] PORTABLE MEMORY DEVICE AND METHOD OF SECURING THE INTEGRITY OF STORED DATA THEREIN UTILIZING A STARTING ADDRESS AND A STORED MEMORY CYCLE NUMBER

[75] Inventor: Alan J. Eisenberg, Monmouth Junction, N.J.

[73] Assignee: Base 10 Systems, Inc., Trenton, N.J.

[21] Appl. No.: 994,382

[22] Filed: Dec. 21, 1992

[51] Int. Cl.⁶ ............................. G06F 12/14; G11C 7/00
[52] U.S. Cl. .................. 395/442; 395/490; 365/236; 365/195; 235/492
[58] Field of Search ........................... 395/425, 2, 442, 395/479, 490; 364/406, 478; 235/380, 492; 365/236, 195

[56] References Cited

U.S. PATENT DOCUMENTS

| | | | |
|---|---|---|---|
| 4,658,357 | 4/1987 | Carroll et al. | 235/380 |
| 4,792,996 | 12/1988 | Oyama | 455/617 |
| 4,816,654 | 3/1989 | Anderl et al. | 235/380 |
| 4,818,855 | 4/1989 | Mongeon et al. | 235/440 |
| 4,829,169 | 5/1989 | Watanabe | 235/492 |
| 4,835,733 | 5/1989 | Powell | 395/425 |
| 4,857,893 | 8/1989 | Carroll | 340/572 |
| 5,317,714 | 5/1994 | Nakagawa et al. | 395/425 |

FOREIGN PATENT DOCUMENTS

| | | |
|---|---|---|
| 0217654 | 4/1987 | European Pat. Off. . |
| 0218523 | 4/1987 | European Pat. Off. . |
| 0540095 | 5/1993 | European Pat. Off. . |

*Primary Examiner*—Glenn Gossage
*Attorney, Agent, or Firm*—Sprung Horn Kramer & Woods

[57] ABSTRACT

A portable memory device and method of securing the integrity of data stored therein. The integrity of the stored data is secured by writing input data into the device in a preselected range of storage locations between a first address and a last address, storing a starting address corresponding to a memory address between the first address and the last address, sequentially addressing the memory from the starting address and writing input data into each of the sequentially addressed storage locations. The writing of input data sequentially from the first address to the last address constitutes a memory cycle and the number of the current memory cycle is stored in the device. The stored output data is transmitted outside of the device along with the number of the current memory cycle, so that each storage location in the range of storage locations has a memory cycle number associated with the data stored therein to indicate if an overwrite and therefore a loss in the integrity of the data has occurred. The writing of input data into the portable memory device may be prevented by producing a write halt signal when the starting address is greater than the last address. A new memory cycle may also be started in response to a restart signal.

24 Claims, 2 Drawing Sheets

| SIGNATURE | CYCLE NO. | DATA |
|---|---|---|
| BITS 0-7 | BITS 8-15 | BITS 16-31 |

PORTABLE MEMORY DEVICE AND METHOD OF SECURING THE INTEGRITY OF STORED DATA THEREIN UTILIZING A STARTING ADDRESS AND A STORED MEMORY CYCLE NUMBER

BACKGROUND OF THE INVENTION

The present invention relates to portable memory devices and methods of using same.

Portable memory devices, sometimes also known as tags, are known in the prior art. U.S. Pat. Nos. 4,658,357, 4,818, 855 and 4,857,893 disclose representative types of these devices.

In the known devices, data is transmitted both to and from the device by modulated electromagnetic waves such as radio waves, magnetic waves or laser light. The incoming waves are demodulated by the device and the data is then processed in the circuitry in the device. The device also has the ability to modulate electromagnetic waves with data to transmit the data outside of the device for receipt by different stations.

The devices are battery powered or can have energy storage means which is charged by electromagnetic energy supplied from a station seeking to read data from or send data to the devices.

While some portable memory devices have read-only memories (ROM's) therein which cannot be altered by data from the stations, some of the devices have memory which can store data received from outside the device.

When a device of this type is used in a critical process where the integrity of the data stored in the device is of prime importance, it is clear from the prior art that, heretofore, the devices were anything but secure.

SUMMARY OF THE INVENTION

The main object of the present invention is to overcome the disadvantages of the prior art portable memory devices.

Another object of the present invention is to provide a portable memory device which secures the integrity of stored data therein.

A still further object of the present invention is to provide a method of securing the integrity of stored data in a portable memory device.

These and other objects and advantages of the present invention are achieved in accordance with the present invention by a portable memory device and a method of securing the integrity of stored data therein.

The method of securing the integrity of stored data in a portable memory device comprises the steps of receiving input data into the portable memory device via modulated electromagnetic waves and providing a memory in a portable memory device having a plurality of storage locations into which data is writable and from which data is readable. Input data is written into a preselected range of storage locations in the memory between a first address and a last address solely by storing a starting address between the first and last addresses, sequentially addressing the memory from the starting address and writing data into each of the sequentially addressed storage locations. The writing of data sequentially from the first to the last address constitutes a memory cycle and the number of the current memory cycle is stored in the portable memory device. The output data which is stored in the portable memory device is transmitted along with the number of the current memory cycle and writing of data into the range of storage locations is prevented at the end of each memory cycle. This is carried out by transmitting a write halt signal from the portable memory device to the data source. Until a restart signal is received by the portable memory device, the writing is prevented.

The portable memory device includes input means such as a receiver for receiving input data via modulated electromagnetic waves, a memory having a plurality of storage locations into which data is written and from which data is read and a processor for writing input data into a preselected range of storage locations in the memory between the first address and the last address. The processor stores a starting address in the memory between the first and last addresses, sequentially addresses the memory from the starting address and writes data into each of the sequentially addressed storage locations. The device also stores the number of the current memory cycle.

In a preferred embodiment of the present invention, the number of the current memory cycle and the starting address are stored in the same memory as the data, but outside the range of storage locations between the first and last addresses.

The memory means of the portable memory device can be modified and will maintain the data stored in it whether power is present or not. Write access to the memory means is through transmission by a data source in an external device or station using modulated digital radio or laser signals. The portable memory device has no physical contact with the data source.

The portable memory device receives digital signals using its internal microcontroller which then transfers the information to its internal memory storage medium. The external device can have no direct access to the memory storage medium.

In accordance with the present invention, the microcontroller will not overwrite any stored data unless the information that is newly written includes an indication that the overwrite occurred, and the overwrite is a sequential continuation at the first address of usable memory after the last address used. Thus the device will therefore not permit a selective memory overwrite in any desired location.

Read access is also through transmission by an external device using modulated digital radio or laser signals. The external device can request information from any memory location to which it is permitted access, using random access methods. The request for the stored data is processed by the microcontroller and the stored information is received and transmitted by that microcontroller to the requesting external device.

The distance between the information source and the portable memory device must be sufficient to permit the portable memory device to pass in proximity to the source and receive the information without physical or electrical interfaces. This allows existing processes to operate as they presently do, while adding the information in such a way as to insure that no operator action is required or permitted, other than bringing the information source into proximity with a portable memory device and therefore will insure that no operator action can cause erroneous or falsified data to be recorded.

The internal microcontroller will permit only sequential write access while permitting random read access. If one defines the sequential writing in a range of storage locations from a first address to a last address in the memory as a memory cycle (i.e., a new memory cycle is started each time the starting address is the first address), the device can use one storage location in memory outside of the range of addresses to store the current number of the memory cycle and another storage location in the memory outside of the range of addresses to store the next available address in that cycle to be written into.

All information supplied to the portable memory device will be appended to the previously supplied data until the last address in the range of addresses of the memory is written to. At that point, the portable memory device will not accept any further information until an external code is supplied, permitting it to start overwriting previously written information in a sequential writing mode. The storage location recording the number of the current memory cycle acts as a cycle counter which is incremented each time a new memory cycle is begun. This storage location will be readable to determine that an overwrite has occurred and the level number of the overwrite. An eight bit memory cycle counter will permit $2^8$ or 256 cycles, while a sixteen bit cycle counter will allow 65,536 memory cycles.

By maintaining the positional information of the next address to be sequentially written to, the portable memory device will permit an initial process to record the starting position and cycle in memory of the memory device which is used to verify that no overwrite has occurred.

In an alternative embodiment of the present invention, a control mechanism can be used to filter both read and write access and logically partition the portable memory device for each of the accessing sources. Passwords can be used and can be modified by appending a new password to the old password and instructing the device to supersede the old password. Priority levels can also be controlled permitting multiple levels of read to different controlled writes.

The physical structure of the portable memory device is that using standard semiconductor random access memory devices with a microcontroller capable of performing a simple set of programmable instructions within a stored program. The system also preferably includes a battery and an antenna permitting greater distance access and which would permit, upon battery failure or rundown, the supply of power for reading by a high energy close proximity source supplying necessary power for reading. The memory is preferably a non-volatile memory so that even when power is lost, the memory will be maintained. Thus, when recharging of the battery takes place, the data saved in the memory can be accessed and read out.

These and other features of the present invention are disclosed in further detail in the following description of the invention taken with the drawings wherein:

DETAILED DESCRIPTION OF THE INVENTION

Figures 1, 3:
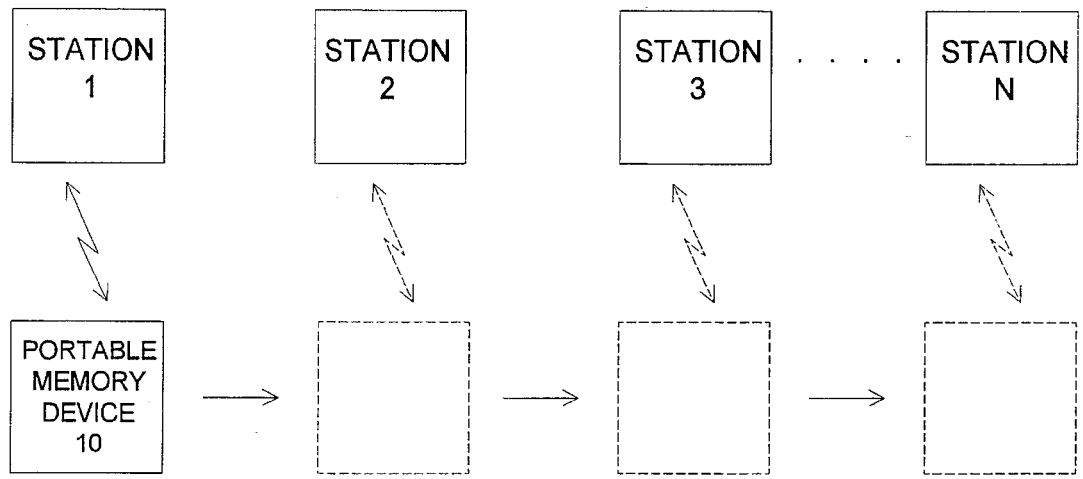
FIG. 1 is a block diagram of a system using a portable memory device according to the present invention.
FIG. 3 shows the data word transmitted by the portable memory device according to the present invention.

Referring to FIG. 1, a portable memory device 10 in accordance with the present invention is useful for having information recorded while a process is being performed on an article (e.g., a container of a chemical at a process site) or entity (e.g., an individual) (not shown). The portable memory device can be in significantly close proximity or attached to the article and can receive this information and store it. Examples of processes of this type are moving an article from one station to another, bringing an article in close proximity to another article or to a station where another article has already been, or performing an operation on an article.

For all of the processes, but especially those that are critical and require confirmation of their occurrence with a high degree of assurance, the stored information requires validation that it has not been altered and that it was stored at the time of occurrence. Additionally, should the device lose its source of power, the stored information must be retrievable, since the information would identify the source of the information as well as the activity which generated it. The device 10 is then able to pass on information obtained from other devices as well as verify the information contained in the memory device associated with the article.

In accordance with the invention, each information source is a processor controlled station 1 to N which is assigned a signature and is positioned either at an entrance to a processing site or at an exit of a processing site, within or at a processing site, or assigned to an individual. The portable memory device 10 can store data defining the time that an action occurred and the type action that has occurred, e.g., a processing step. The device 10 can then transfer information from one station to another, for example, and if two devices are operated on at the same station at the same or different times, the identification or any ancillary information from one device can be written to the other.

Information can be initially recorded within a portable memory device, which information associates with an article, e.g., a container of chemicals being processed, or individual the definition and sequences of a required process to be performed on the article, as well as any exclusionary information pertaining to other articles. This information can then be checked by the information source to insure that defined processes and their order are followed and any exclusionary actions do not occur. This constant monitoring will help to insure that unrecoverable errors do not occur by generating an alarm when an action is attempted which does not follow directions stored in the portable memory device.

For example, when a portable memory device is attached to a container of a chemical, this information is conveyed to a station at the entrance of a processing site, which then records the time of entry. The subsequent attempt to allow another chemical, which is reactive with the first chemical, to enter the same site will be prevented.

Figure 2:
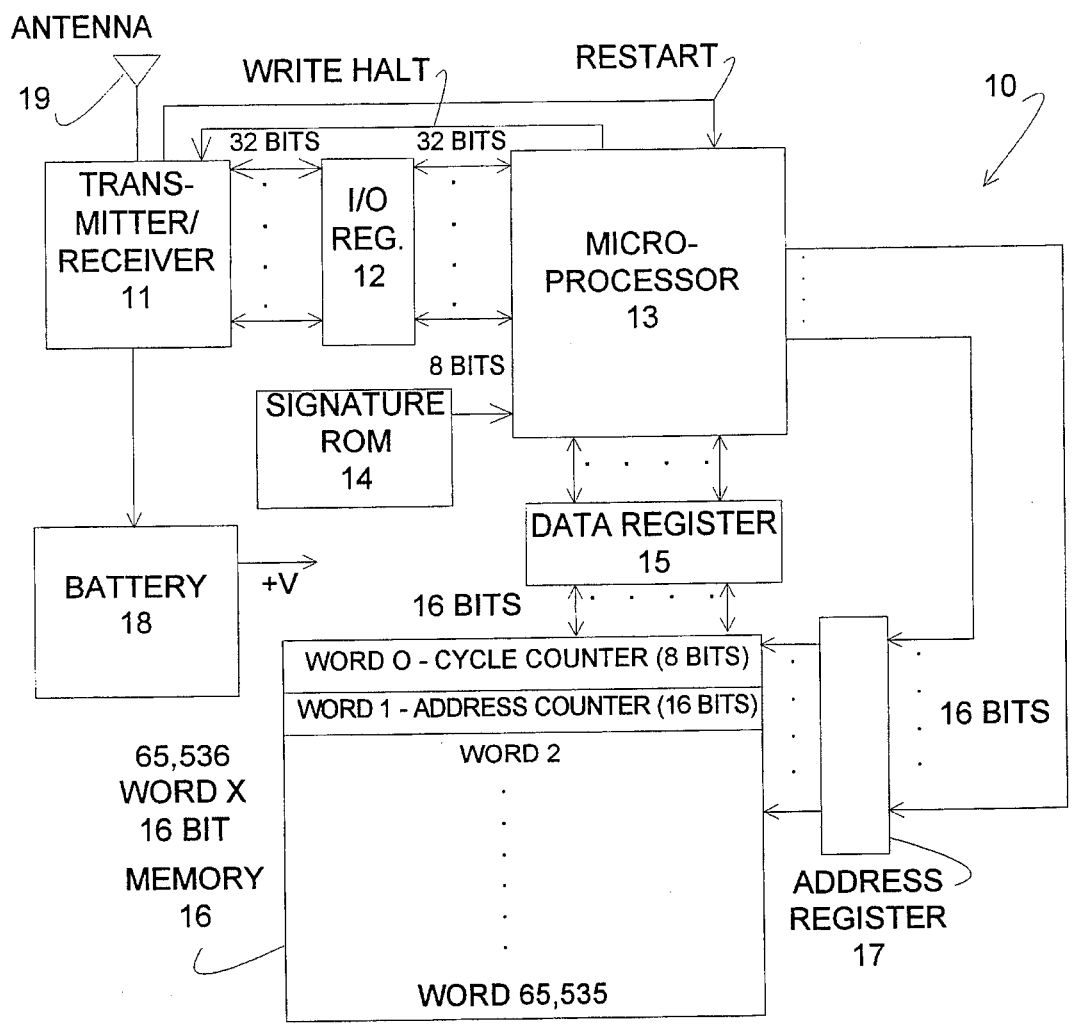
FIG. 2 is a block diagram of the portable memory device according to the present invention.

Referring to FIGS. 2 and 3, the portable memory device 10 includes a transmitter/receiver 11 which receives modulated electromagnetic waves and demodulates the waves to extract data therefrom. The transmitter/receiver 11 also acts to modulate electromagnetic waves with data and transmits the same outside of the device via antenna 19.

Data which is demodulated when received is passed to input/output register 12 and data to be transmitted is received from input/output register 12. Input/output register 12 also acts as a data buffer between the microprocessor 13 and the transmitter/receiver 11.

Microprocessor 13 communicates with a signature ROM 14 which holds a signature code which uniquely identifies the device and distinguishes it from other devices being used in a system. For the purposes of illustration, the signature ROM 14 has eight bits of code information so that $2^8$ or 256 different devices can be uniquely identified in the system.

The device also includes a battery 18 which produces a voltage +V which is supplied to all of the elements of the device. Moreover, battery 18 includes energy storage means such as a capacitor which receives electromagnetic waves from the transmitter/receiver 11 in order to charge the capacitor in the event that the battery is at a low voltage level.

Microprocessor 13 has access to memory 16 which, by way of example, is a memory including 65,536 words by sixteen bits. The memory 16 is addressed by a sixteen bit address register 17 and a sixteen bit data register 15. A sixteen bit address is applied to the memory 16 and data at that address, a word of sixteen bits, is applied to data register 15 when the memory is read. During a write mode, an address is applied at address register 17 and data appearing in the data register 15 is written into the storage location being addressed.

In accordance with the invention, the memory 16 is divided into the sections as shown in FIG. 2. Word 0 constitutes a cycle counter which uses eight of the sixteen bits therein and word 1 constitutes an address counter which utilizes sixteen bits. Words 2–65,535 provide a preselected range of storage locations between the first address of word 2 and the last address of word 65,535. The microprocessor 13 initially stores the address of word 2 in word 1 and the cycle number 0 in word 0. When an external station 1 to N seeks to write data into the portable memory device, the data is received via the receiver 11 and fed to the input/output register 12. The microprocessor 13 then initiates a write cycle by first reading the address stored in word 1 which is the starting address, loading this address starting into the data register 15 and then passing this address through to the address register 17. The input data in register 12 is then fed to register 15 where it is written into word 2. The microprocessor then increments the number in the address counter in word 1 by one.

This process is repeated for each data word to be written into the memory 16.

For example, if station 1 seeks to write ten data words into memory 16 at the end of the data transfer the cycle counter will indicate that it is still in cycle 0 and the address counter will indicate that the starting address is the address of word 12. Thus when the portable memory device 10 moves to station 2 and station 2 seeks to write data into the memory 16, it will be written starting at the starting address of word 12. This is continued until data is written into word 65,535. At this point, the microprocessor will recognize that the next starting address is word 2 and will produce a write halt signal which is transmitted externally of the device. Unless and until the microprocessor receives a restart signal from one of the stations, any further writing into words 2–65,535 will be prevented. And when the restart signal is received, the cycle counter will be incremented by 1. This secures the integrity of the data in memory.

The microprocessor 13 has the ability to read data from any location in memory on a random access basis and transmit this data externally of the device. FIG. 3 shows the format of such transmitted data. Specifically, the data word transmitted by the device includes eight bits of signature code which identify which device the data is coming from, eight bits of the cycle number from the cycle counter and sixteen bits of data from the data word being read.

In this way, stations 1 to N recognize that the data that was written into the memory and received from the memory was written in during a particular cycle. If the memory device receives a restart signal and overwrites data between words 2 and 65,535, before such overwriting begins, the cycle counter will be incremented by one and thus any data which is transmitted from the device will indicate the fact that data has been overwritten and thus is not the same as data written in during a previous memory cycle.

It will be understood by those of ordinary skill in this art that the cycle counter and address counter can be contained in a single word or memory location in the memory or in more than two words in memory, depending upon the configuration of the memory and the needs of the system. It is also understood that the number of bits associated with the signature code, the cycle number, the address counter and the data can be varied depending upon the needs of the system and still be within the scope of the present invention.

While the invention herein disclosed has been described by specific embodiments and applications thereof, it is understood that numerous modifications and variations can be made thereto by those of ordinary skill in the art without departing from the spirit and scope of the present invention.

What is claimed is:

1. A method of securing the integrity of data stored in a portable memory device, comprising the steps of:

providing a memory in the portable memory device having a plurality of storage locations which are sequentially addressable and into which input data is writable and from which output data is readable;

preselecting a range of storage locations with a set of addresses extending from a first address to a last address;

storing a starting address in the memory corresponding to a memory address between the first address and the last address;

writing input data into the memory only within the preselected range of storage locations by sequentially addressing the memory from the starting address, a new memory cycle being started each time the starting address is the first address;

storing a current memory cycle number in the memory;

incrementing the stored memory cycle number for each new memory cycle; and outputting the stored memory cycle number with the output data read from the preselected range of storage locations, whereby each location in the preselected range of storage locations has a memory cycle number associated with the data stored therein to indicate if an overwrite and therefore a loss in the integrity of the data has occurred.

2. The method according to claim 1, wherein the step of storing the starting address comprises storing the starting address in a portion of the memory outside of the preselected range of storage locations.

3. The method according to claim 1, wherein the step of storing the memory cycle number comprises storing the memory cycle number in a portion of the memory outside of the preselected range of storage locations.

4. The method according to claim 1, wherein the memory is a random access memory and said method further comprises output data from the preselected range of storage locations by selectively accessing addresses therein.

5. The method according to claim 1, further comprising the step of receiving the input data via modulated electromagnetic waves.

6. The method according to claim 1, further comprising providing a read-only memory in the portable memory device having a unique signature code stored therein and wherein the signature code is provided with the output data and the stored memory cycle number.

7. The method according to claim 1, wherein the stored starting address is incremented by one for each storage location into which input data is written to indicate a next available address to be written into.

8. The method according to claim 1, further comprising preventing writing of input data into the memory at an end of a memory cycle.

9. The method according to claim 8, wherein the step of preventing comprises producing a write halt signal when the starting address is greater than the last address.

10. The method according to claim 9, further comprising starting a new memory cycle and incrementing the stored memory cycle number in response to a restart signal.

11. A portable memory device, comprising:

a memory having a plurality of storage locations which are sequentially addressable and into which input data is writable and from which output data is readable, the plurality of storage locations including a preselected range of storage locations with a set of addresses extending from a first address to a last address; and a processor for storing a starting address in the memory corresponding to a memory address between the first address and the last address and for writing input data into the memory only within the preselected range of storage locations by sequentially addressing the memory from the starting address in a memory cycle, wherein a new memory cycle is started each time the starting address is the first address, and wherein the processor stores a current memory cycle number in the memory and increments the stored memory cycle number for each new memory cycle; and wherein the processor outputs the stored memory cycle number with the output data read from the preselected range of storage locations, whereby each location in the preselected range of storage locations has a memory cycle number associated with the data stored therein to indicate if an overwrite and therefore a loss in the integrity of the data has occurred.

12. The device according to claim 11, wherein the processor stores the starting address in a portion of the memory outside of the preselected range of storage locations.

13. The device according to claim 11, wherein the processor stores the memory cycle number in a portion of the memory outside of the preselected range of storage locations.

14. The device according to claim 11, wherein the memory is a random access memory and wherein the processor reads output data from the preselected range of storage locations by selectively accessing addresses therein.

15. The device according to claim 11, further comprising a receiver for receiving input data via modulated electromagnetic waves.

16. The device according to claim 11, further comprising a read-only memory having a unique signature code stored therein and wherein the processor outputs the signature code with the output data and the stored memory cycle number.

17. The device according to claim 11, wherein the processor increments the stored starting address by one for each storage location into which input data is written.

18. The device according to claim 11, wherein the processor further comprises means for preventing writing of input data into the memory at an end of a memory cycle.

19. The device according to claim 18, wherein the means for preventing comprises a write halt signal produced by the processor when the starting address is greater than the last address.

20. The device according to claim 19, wherein the processor increments the stored memory cycle number in response to receiving a restart signal.

21. A control process comprising the steps of:

moving a portable memory device from one station to at least one other station;

transmitting input data from a station to the portable memory device for storage therein;

receiving output data from the portable memory device at a station; and securing the integrity of data stored in the portable memory device by providing a memory in the portable memory device having a plurality of storage locations which are sequentially addressable and into which input data is writable and from which output data is readable;

preselecting a range of storage locations with a set of addresses extending from a first address to a last address;

storing a starting address in the memory corresponding to a memory address between the first address and the last address;

writing the input data into the memory only within the preselected range of storage locations by sequentially addressing the memory from the starting address, a new memory cycle being started each time the starting address is the first address;

storing a current memory cycle number in the memory;

incrementing the stored memory cycle number for each new memory cycle; and outputting the stored memory cycle number with the output data read from the preselected range of storage locations, whereby each location in the preselected range of storage locations has a memory cycle number associated with the data stored therein to indicate if an overwrite and therefore a loss in the integrity of the data has occurred.

22. The process according to claim 21, further comprising preventing writing of input data into the memory at an end of a memory cycle.

23. The process according to claim 22, wherein the step of preventing comprises producing a write halt signal and transmitting the write halt signal to a station when the starting address is greater than the last address.

24. The process according to claim 23, further comprising incrementing the stored memory cycle number in response to a restart signal from a station.

* * * * *